(12) United States Patent
Chen et al.

(10) Patent No.: US 7,512,924 B2
(45) Date of Patent: Mar. 31, 2009

(54) SEMICONDUCTOR DEVICE STRUCTURE AND METHODS OF MANUFACTURING THE SAME

(75) Inventors: Hsien-Wei Chen, Sinying (TW); Hsueh-Chung Chen, Yonghe (TW); Yi-Lung Cheng, Danshuei Township, Taipei County (TW); Shin-Puu Jeng, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 396 days.

(21) Appl. No.: 11/333,618

(22) Filed: Jan. 17, 2006

(65) Prior Publication Data

US 2007/0166887 A1  Jul. 19, 2007

(51) Int. Cl.
*G06F 17/50* (2006.01)
(52) U.S. Cl. ...................................................... 716/18
(58) Field of Classification Search ...................... 716/1, 716/12–14, 18
See application file for complete search history.

(56) References Cited

U.S. PATENT DOCUMENTS

| | | | |
|---|---|---|---|
| 6,782,512 B2 * | 8/2004 | Asakawa | 716/1 |
| 6,854,095 B2 * | 2/2005 | Idani | 716/2 |
| 7,017,133 B2 * | 3/2006 | Idani et al. | 716/7 |
| 7,062,732 B2 * | 6/2006 | Ito et al. | 716/5 |
| 7,146,593 B2 * | 12/2006 | Travis et al. | 716/10 |
| 7,171,645 B2 * | 1/2007 | Ito et al. | 716/19 |
| 7,235,424 B2 * | 6/2007 | Chen et al. | 438/107 |
| 7,322,014 B2 * | 1/2008 | Travis et al. | 716/2 |
| 2004/0098688 A1 * | 5/2004 | Vuong et al. | 716/8 |
| 2005/0044520 A1 * | 2/2005 | Vuong et al. | 716/12 |
| 2006/0230959 A1 * | 10/2006 | Meijer et al. | 101/368 |

* cited by examiner

*Primary Examiner*—Stacy A Whitmore
(74) *Attorney, Agent, or Firm*—Thomas, Kayden, Horstemeyer & Risley

(57) ABSTRACT

A method of generating a layout for a semiconductor device array is provided. A first layout is provided, comprising an active conductive feature, a boundary area surrounding the active conductive feature, and an open area other than the active conductive feature and the boundary area. A plurality of dummy templates of different pattern densities are provided, each of which comprises a plurality of dummy seeds. A second layout is generated by adding the dummy seeds on the open area according to at least one of the dummy templates.

16 Claims, 15 Drawing Sheets

SEMICONDUCTOR DEVICE STRUCTURE AND METHODS OF MANUFACTURING THE SAME

BACKGROUND

The present invention relates to an integrated circuit, and, more particularly, to a semiconductor device structure and methods of manufacturing the same.

In the art of fabricating semiconductors, it is important that the surface of a semiconductor wafer be planarized in order to meet the requirements of optical projection lithography. Two common techniques used to achieve planarity on a semiconductor surface are the Spin-On Glass (SOG) etchback process and the Chemical Mechanical Polishing (CMP) process. Although both processes improve planarity on the surface of a semiconductor wafer, CMP has been shown to have a higher level of success in improving global planarity. The assurance of planarity is crucial to the lithography process as the depth of focus of the lithography process is often inadequate for surfaces which do not have a consistent height.

The amount of material removed during the CMP process has been shown to be dependent upon the pattern density of the topography of the layers being polished.

Dummy patterns may be added in order to equalize the pattern density of topography on the surface of a wafer. Referring to FIGS. 1A~1C, a conventional method of inserting dummy patterns is illustrated. FIG. 1A illustrates an exemplary IC layout 100A, wherein the shaded parts represent conductive features 110 and 115. Using FIG. 1B as an example, a dummy cell 101a and an accompanying blank space 103a are organized as a dummy unit 10a. The dummy unit 10a is repeatedly laid over IC layout 100A for forming IC layout 100B comprising dummy patterns in the open area thereof. For example, a dummy unit 10a is first positioned at a corner of IC layout 100B. Other dummy units are then subsequently laid over IC layout 100B. If the dummy cell is adjacent to conductive feature 110 or 115, the corresponding dummy unit is removed. Using FIG. 1C as an example, the blocks marked with slant lines are dummy cells that are allowed to be inserted, and the blocks marked with cross lines are dummy cells that are not allowed to be inserted because they are adjacent to the conductive feature. Dummy units 10a, 10b, 10c, and 10d, forming a dummy structure 10, are added to IC layout 100C. Referring to FIG. 1D, after insertion of dummy units, IC layout 100D comprises conductive features 110 and 115, and dummy structure 10.

The described conventional method has several disadvantages. First, it is time consuming to lay numerous dummy units over an IC layout. Second, it is difficult to achieve a suitable pattern density by inserting dummy units of the same size and shape. A large amount of computing resource is required to perform the conventional method. Additionally, it is difficult to estimate the achieved pattern density before the dummy insertion is complete. Failing to achieve a suitable pattern density causes problems in subsequent planarization processes.

Hence, there is a need for systems and methods that address problems arising from the existing technology.

SUMMARY

A method of generating a layout for a semiconductor device array is provided. A first layout is provided, comprising an active conductive feature, a boundary area surrounding the active conductive feature, and an open area other than the active conductive feature and the boundary area. A plurality of dummy templates of different pattern densities are provided, each of which comprises a plurality of dummy seeds. A second layout is generated by adding the dummy seeds on the open area according to at least one of the dummy templates.

Also disclosed is a method of fabricating a semiconductor wafer having at least one integrated circuit. A plurality of active conductive features are formed on a surface of a substrate of the semiconductor wafer, each of the active conductive features being surrounded by a boundary area, wherein adjacent boundary areas are separated by an open area. A target pattern density is determined for the surface of the substrate. A plurality of dummy structures are fabricated on the surface of the semiconductor in the open area, wherein the dummy structures and the active conductor traces forming the target pattern density over the surface of the substrate. The surface of the semiconductor wafer is polished to provide a planar surface on the substrate, whereby the dummy structures cooperate with the active conductive features to improve standardized polishing of the wafer.

Also disclosed is a system of generating a layout for a semiconductor device array. An interface receives a first layout comprising an active conductive feature, a boundary area surrounding the active conductive feature, and an open area other than the active conductive feature and the boundary area. A database stores a plurality of dummy templates of different pattern densities, each of which comprises a plurality of dummy seeds. A processor generates a second layout by adding the dummy seeds on the open area according to at least one of the dummy templates.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION

The invention will now be described with reference to FIGS. 2 through 5, which generally relate to semiconductor manufacturing.

In the following detailed description, reference is made to the accompanying drawings which form a part hereof, and in which is shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense. The leading digit(s) of reference numbers appearing in the Figures corresponds to the Figure number, with the exception that the same reference number is used throughout to refer to an identical component which appears in multiple figures.

Figure 1A:
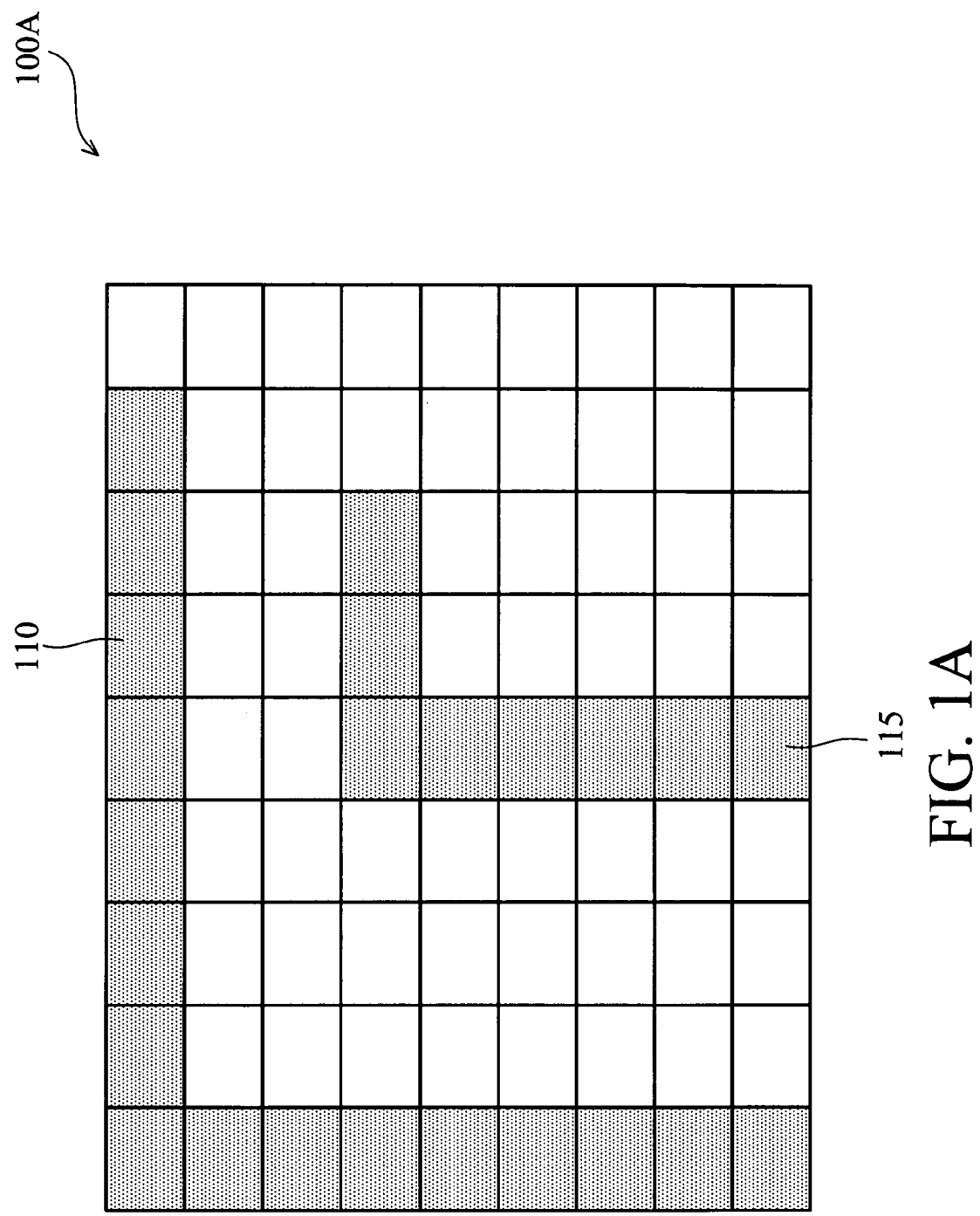
FIGS. 1A~1D illustrate a conventional method of inserting dummy structures.
Figure 1B:
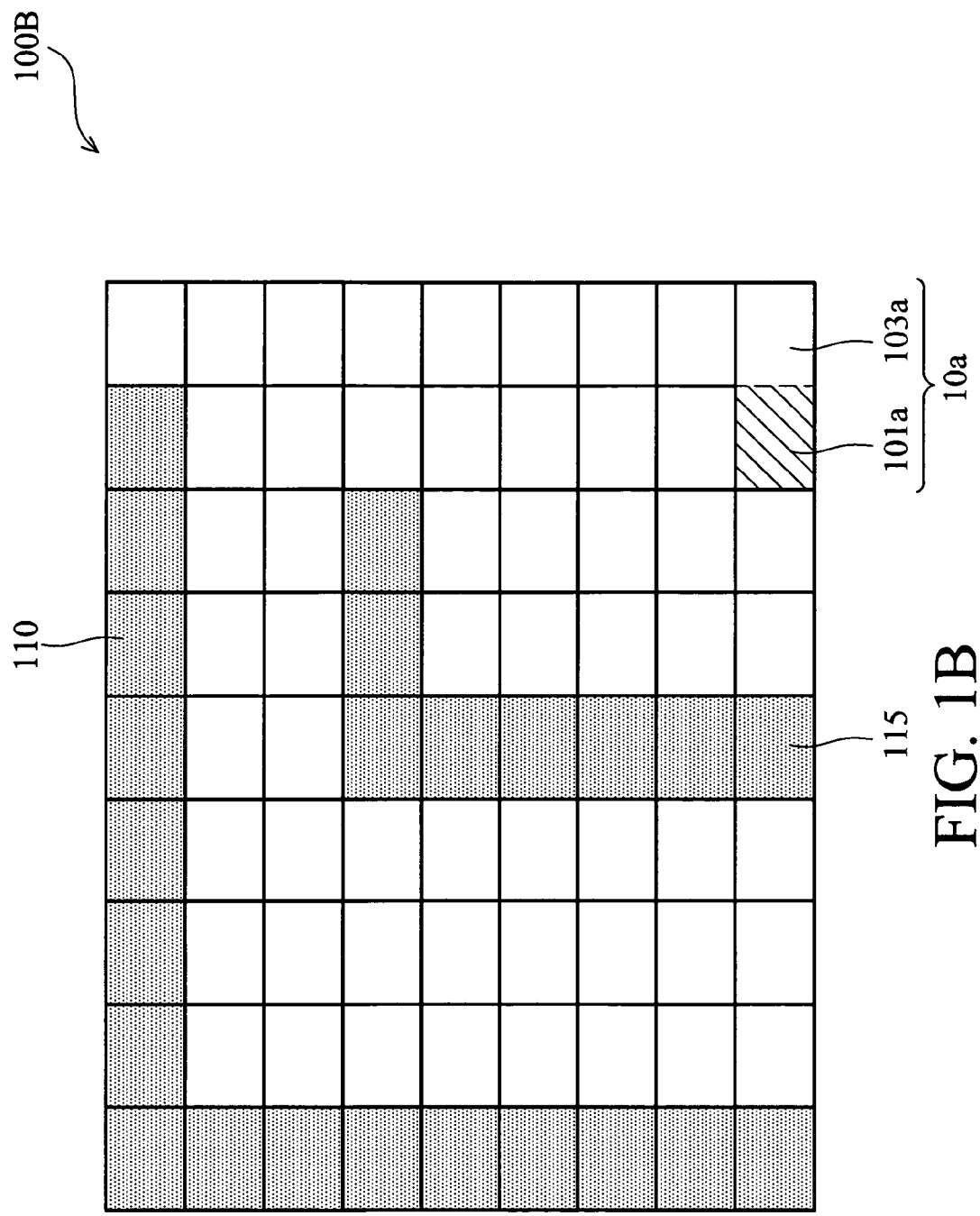
Figure 1C:
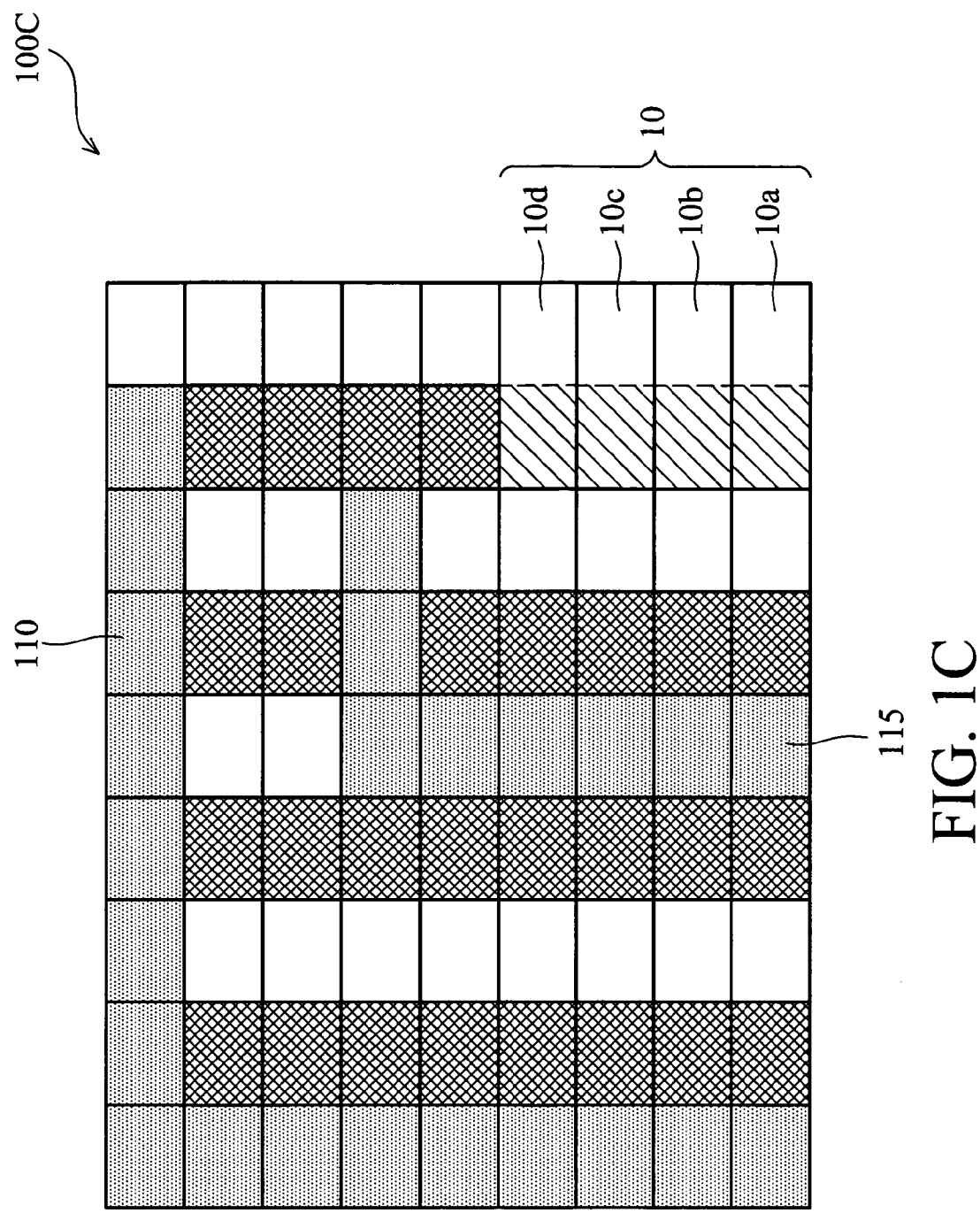
Figure 1D:
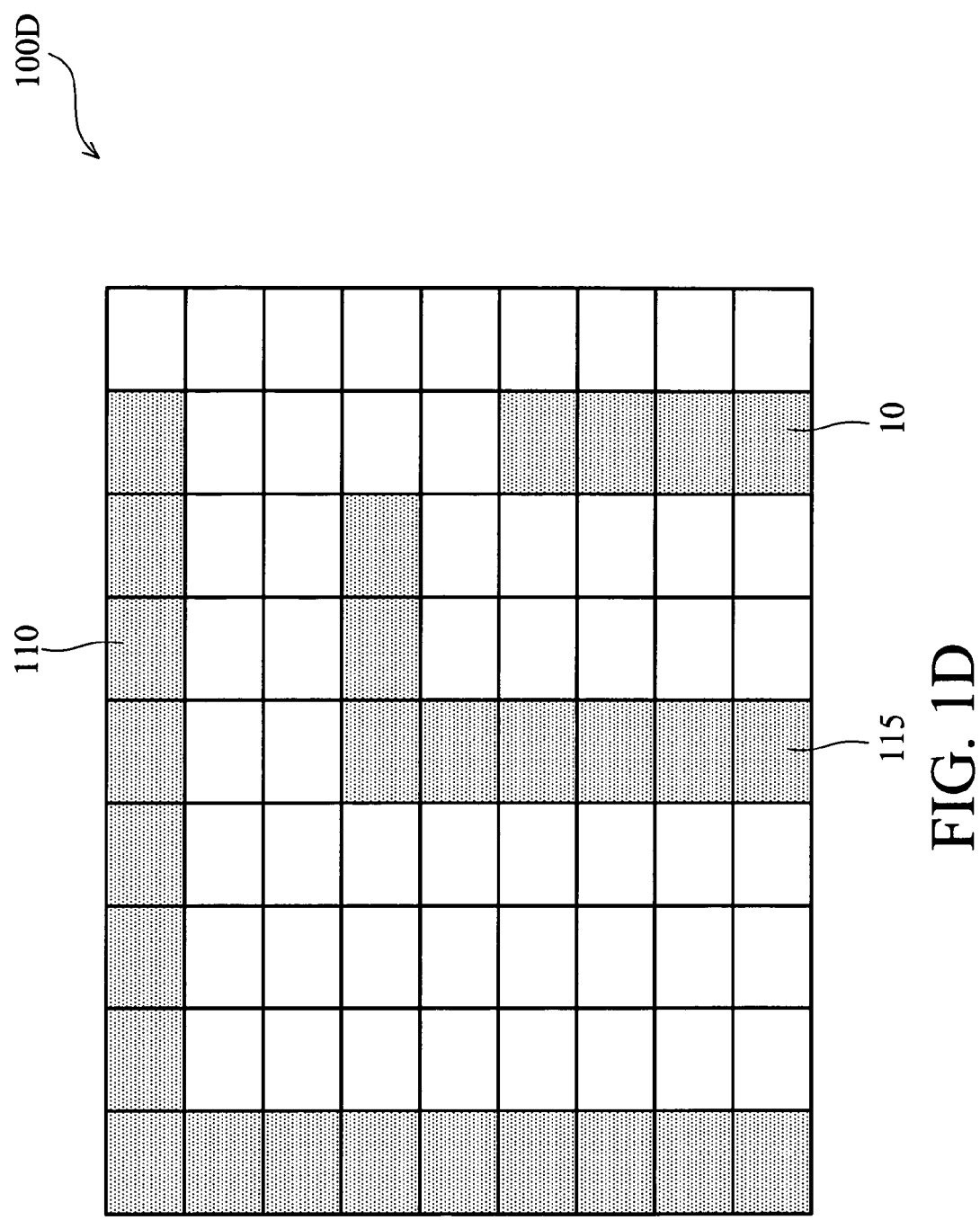
Figure 2:
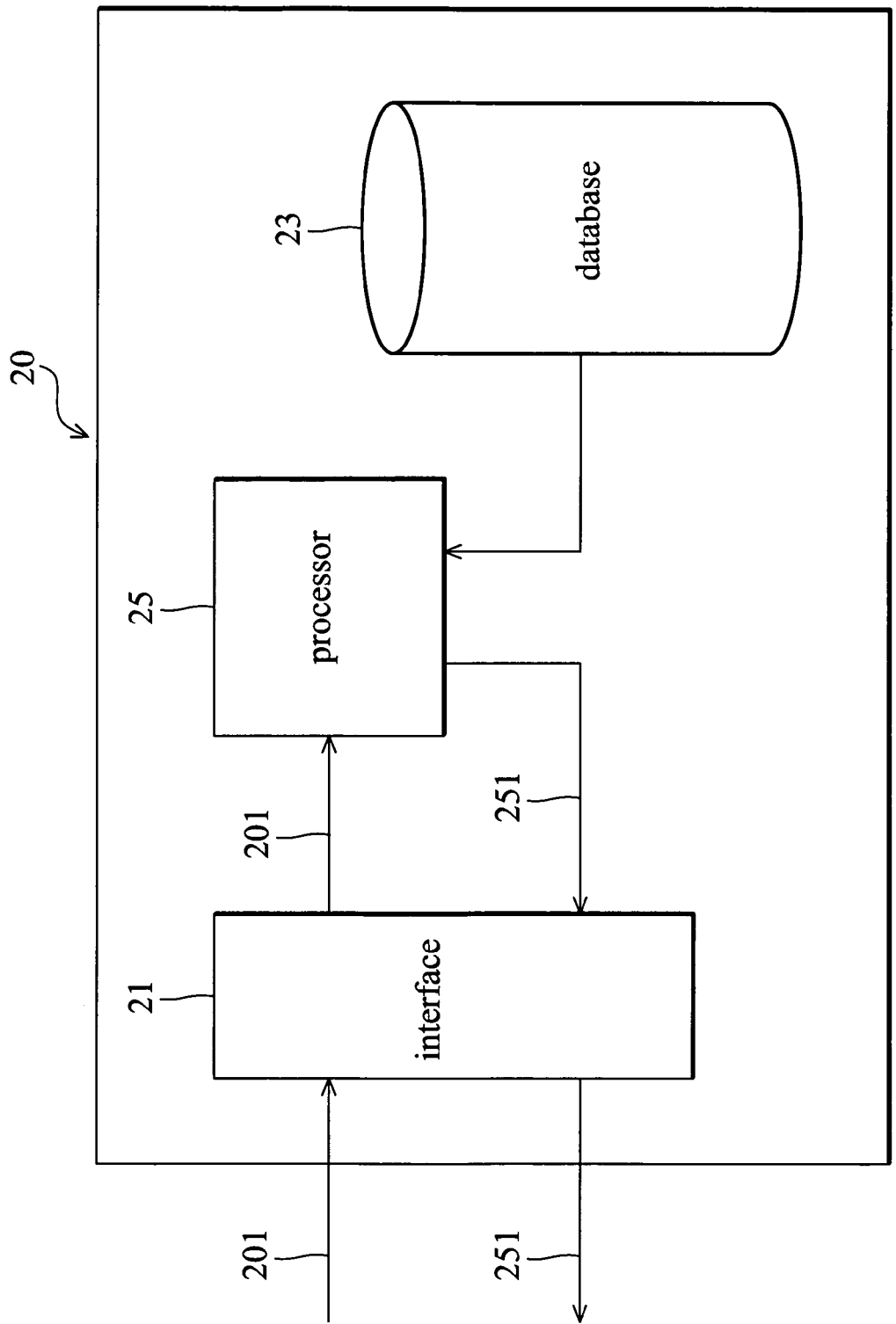
FIG. 2 is a schematic view of an embodiment of a system of generating a layout for a semiconductor device array.

FIG. 2 is a schematic view of an embodiment of a system of generating a layout for a semiconductor device array. A system 20 generates a layout for a semiconductor device array, comprising an interface 21, a database 23, and a processor 25.

Figure 3A:
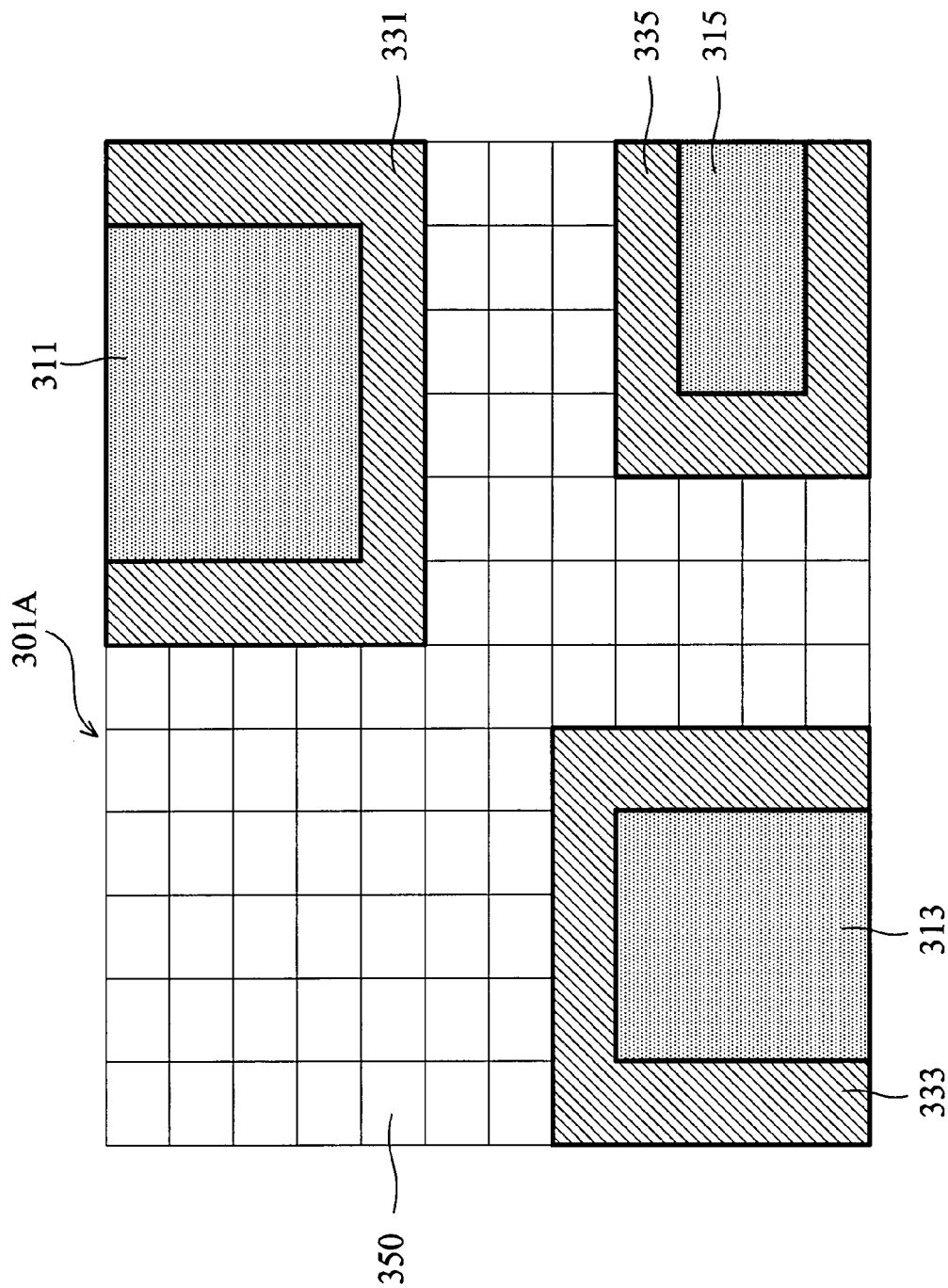
FIGS. 3A~3F illustrate embodiments of layouts.

The interface 21 receives a first layout 201 comprising an active conductive feature, a boundary area surrounding the active conductive feature, and an open area other than the active conductive feature and the boundary area. Referring to FIG. 3A, a layout 301A comprises active conductive features 311, 313, and 315. The active conductive features 311, 313, and 315 are surrounded by boundary areas 331, 333, and 335, respectively. Layout 301A also comprises an open area 350 other than the active conductive features 311, 313, and 315 and the boundary areas 331, 333, and 335.

Figure 3B:
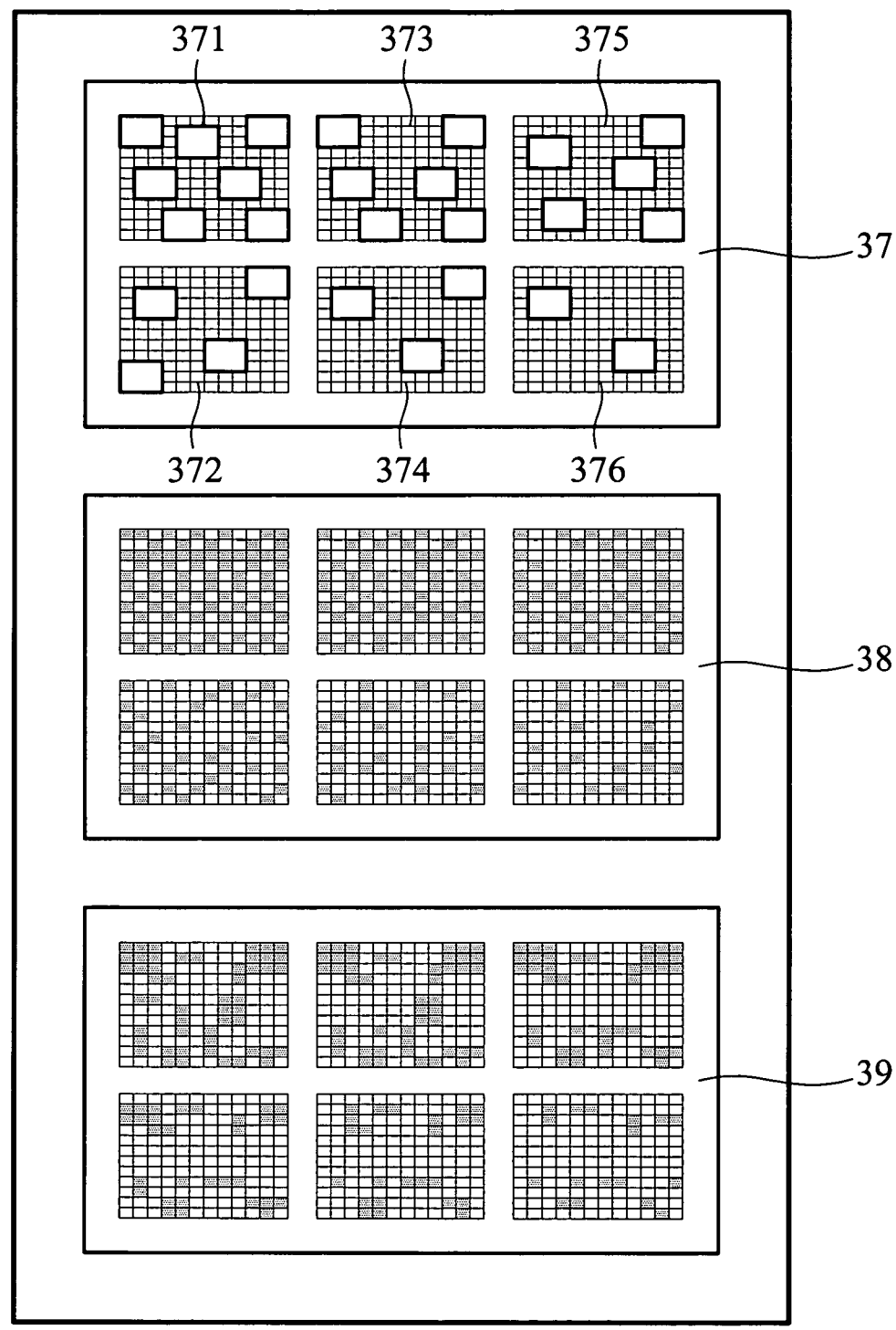
Figure 3C:
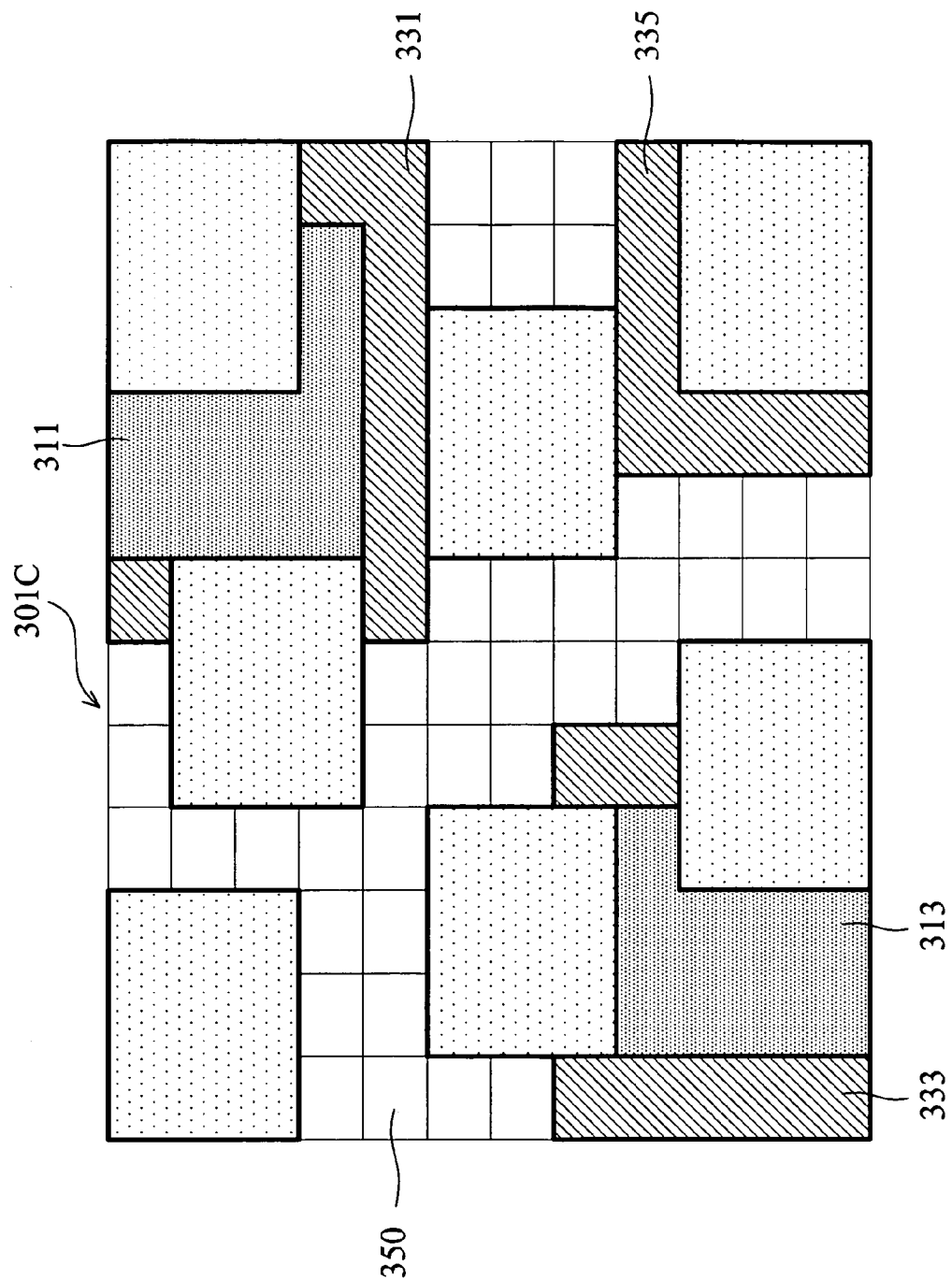
Figure 3D:
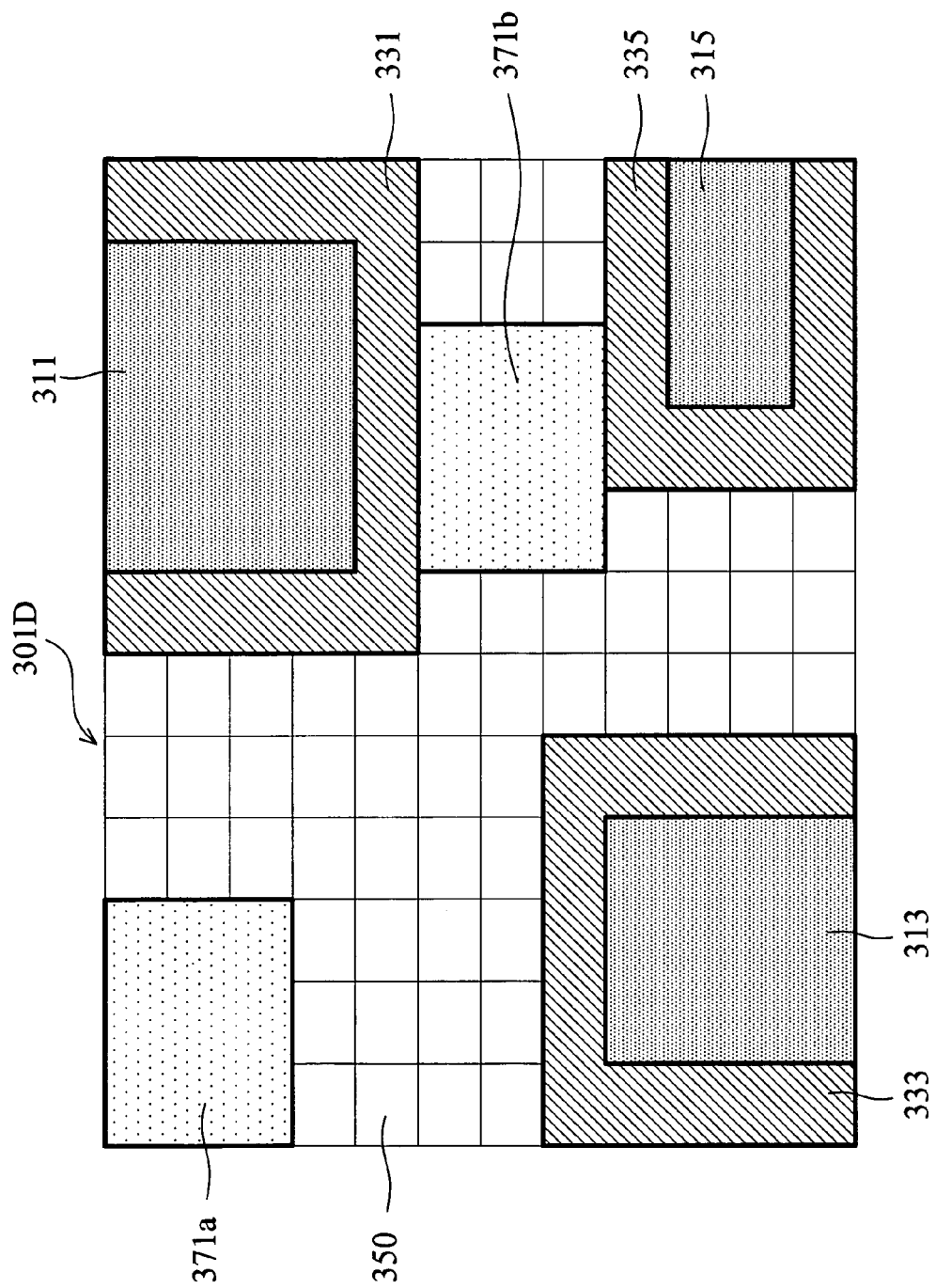
Figure 3E:
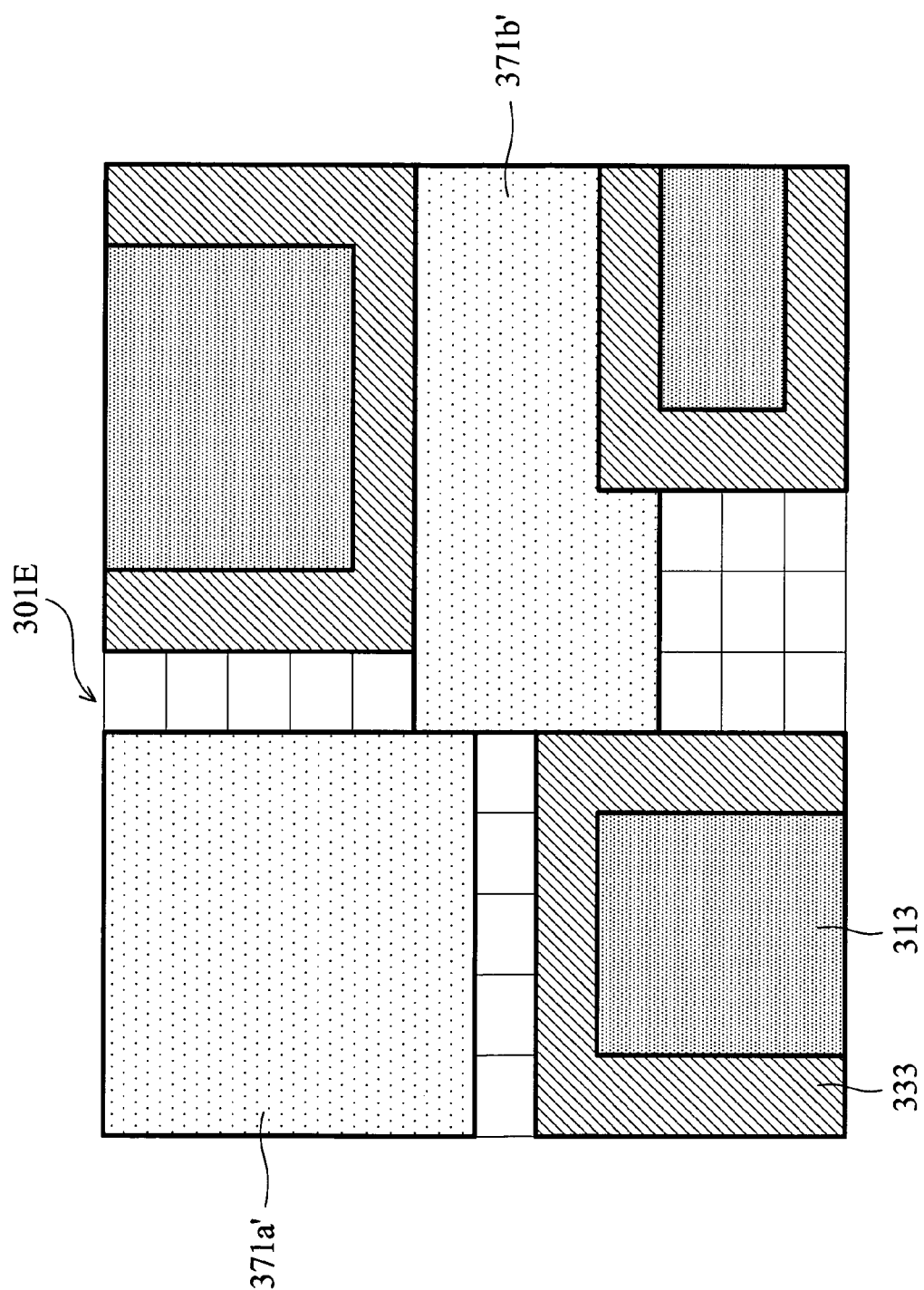
Figure 3F:
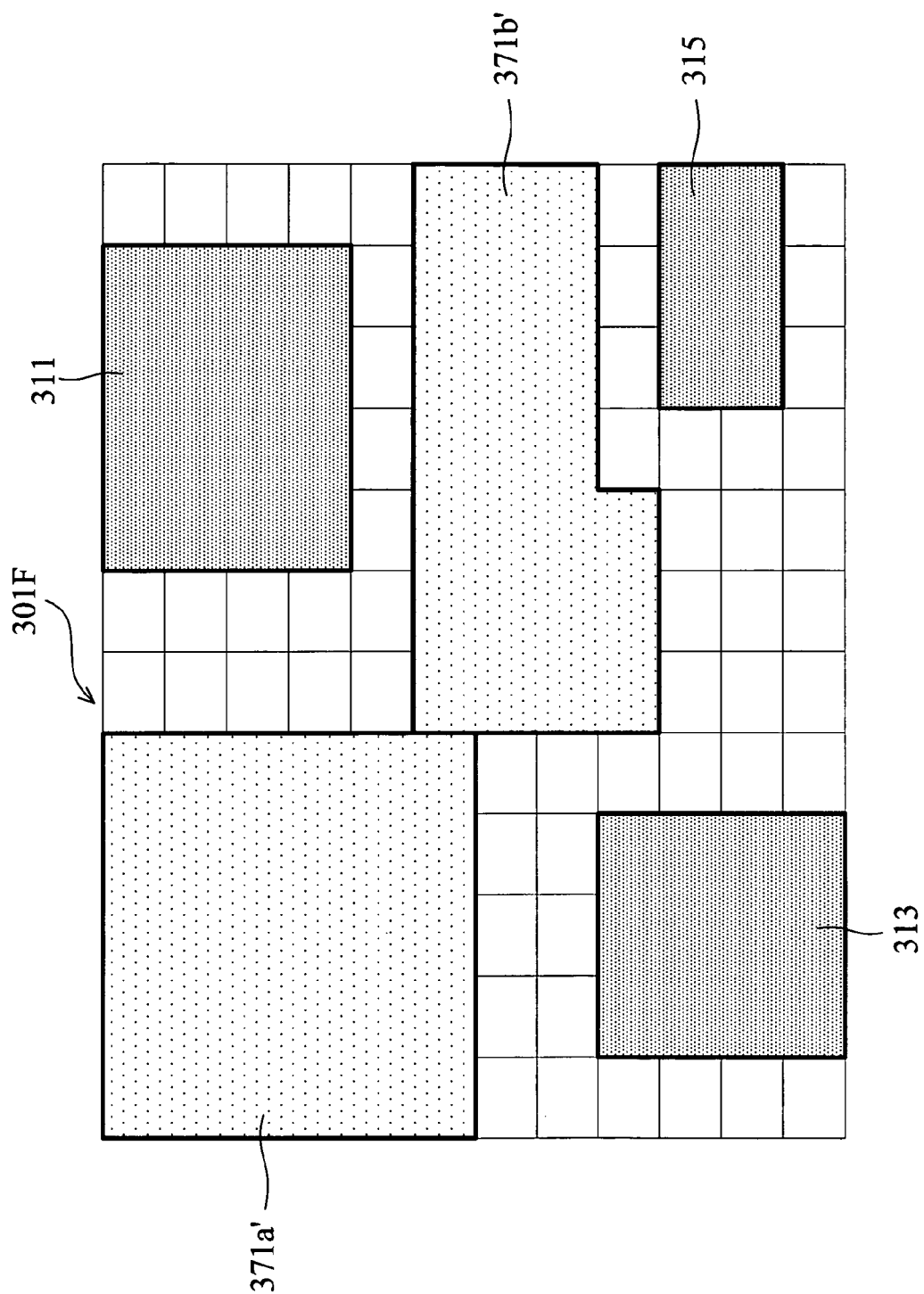
Figure 3G:
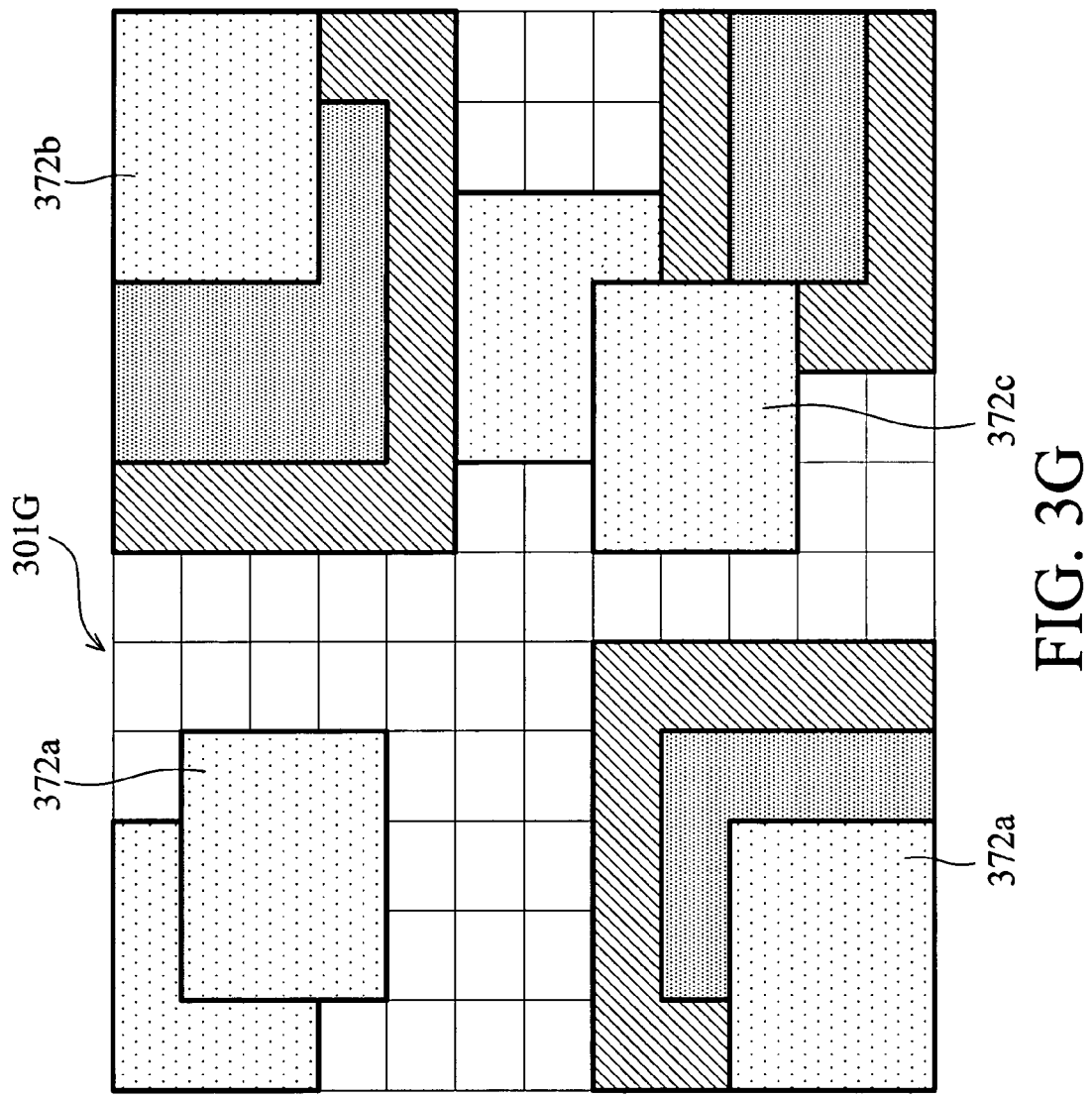

Database 23 stores a plurality of dummy templates of different pattern densities, each of which comprises a plurality of dummy seeds. Referring to FIG. 3B, exemplary dummy templates are illustrated.

Processor 25 generates a second layout 251 by integrating one of the dummy templates with the first layout 201. For example, the dummy seeds comprised in the selected dummy template are added on the open area of the layout 301A of FIG. 3A. The second layout 251 is sent to interface 21, and output from the interface 21.

Figure 4A:
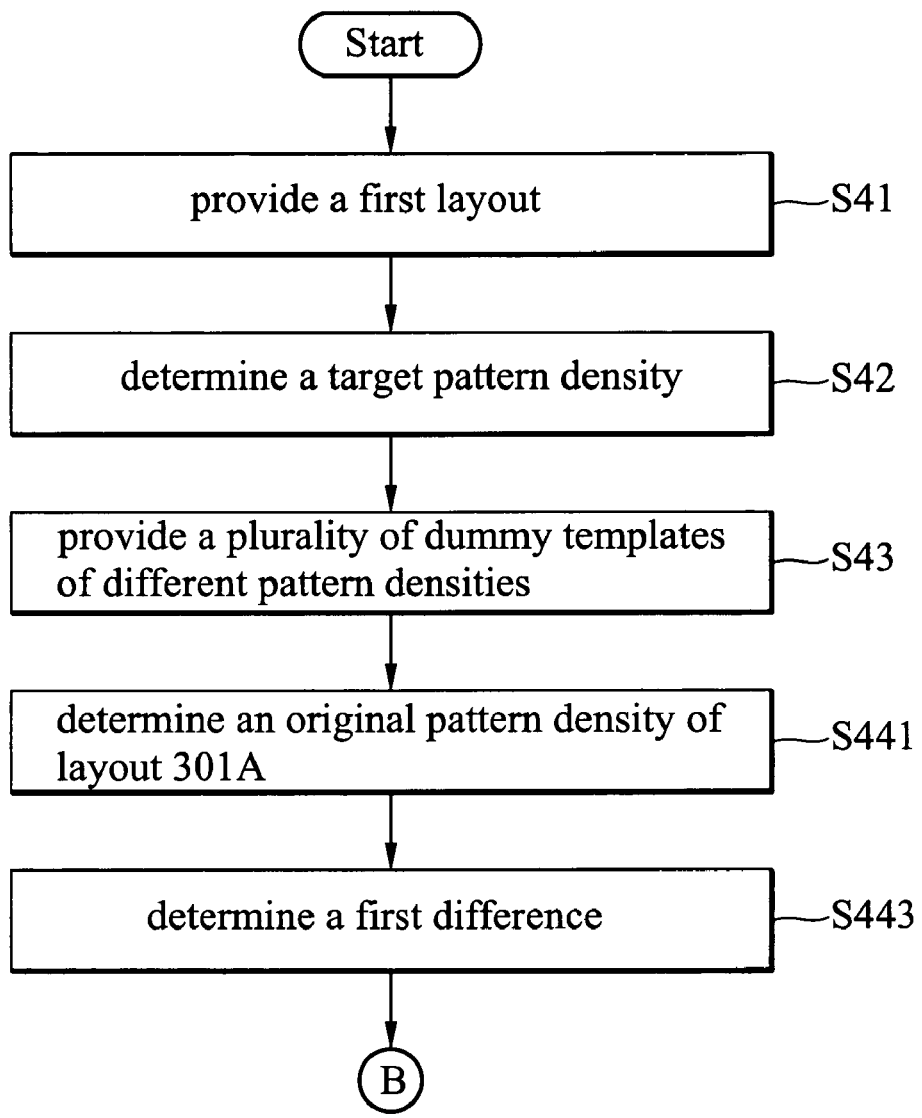
FIGS. 4A and 4B illustrate a flowchart of an embodiment of a method of generating a layout for a semiconductor device array.
Figure 4A:
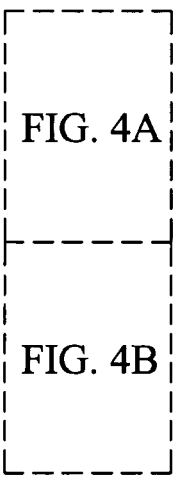
Figure 4B:
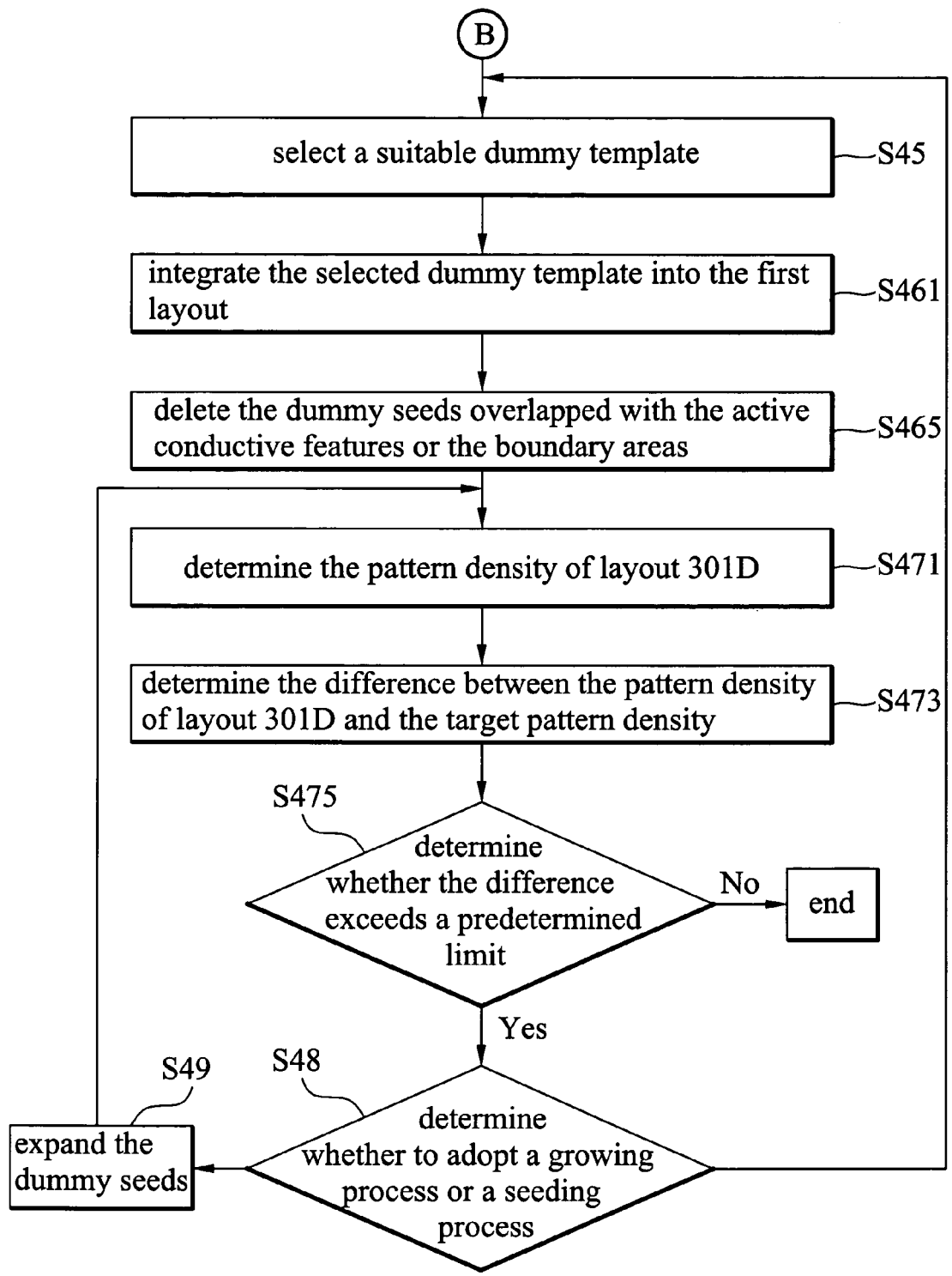

FIGS. 4A and 4B illustrate a flowchart of an embodiment of a method of generating a layout for a semiconductor device array.

In step S41, a first layout is provided. For example, the first layout can be the one illustrated in FIG. 3A. Layout 301A comprises active conductive features 311, 313, and 315. The active conductive features 311, 313, and 315 are surrounded by boundary areas 331, 333, and 335, respectively. Layout 301A also comprises an open area 350 other than the active conductive features 311, 313, and 315 and the boundary areas 331, 333, and 335.

In step S42, a target pattern density is determined for the second layout. Here, for example, the target pattern density is set to 60%.

In step S43, a plurality of dummy templates of different pattern densities are provided. Each of the dummy templates comprises a plurality of dummy seeds. For example, dummy templates provided here can be arranged as the dummy template libraries 37, 38, and 39. Each of the dummy template libraries comprises a plurality of dummy template groups. For example, dummy template library 37 comprises dummy template groups 371~376. Dummy template groups 371~376 of dummy template library 37 comprise dummy templates of pattern density 44%, 25%, 38%, 19%, 31%, and 13%, respectively. Similarly, dummy template groups of dummy template libraries 38 and 39 comprise dummy templates of different pattern densities, respectively. Here, the pattern density is determined by dividing the entire area of the dummy template by the area occupied by dummy seeds comprised therein.

In step S441, an original pattern density of layout 301A is determined. Here, for example, the original pattern density of layout 301A is 21%. In step S443, a first difference between the target pattern density and the original pattern density is determined. Here, the target pattern density is 60% and the original pattern density is 21%, thus the first difference is 39%.

In step S45, a suitable dummy template (hereinafter referred to as a first dummy template) is selected from the dummy templates provided in step S42 according to the first difference. Here, the first difference is 39%, and a dummy template of pattern density 44% is selected from dummy template library 37.

In step S461, the selected dummy template (pattern density 44%) is integrated into the first layout. Using FIG. 3C as an example, the dummy seeds of the selected dummy template are added into layout 301C, and part of the dummy seeds are overlapped with the active conductive features 311, 313, and 315 or boundary areas 331, 333, and 335.

In step S465, the dummy seeds overlapped by the active conductive features or the boundary areas are deleted. Using FIG. 3D as an example, dummy seeds 371a and 371b do not overlap any of the active conductive features or the boundary areas, thus, dummy seeds 371a and 371b are not removed from layout 301D.

In step S471, the pattern density of layout 301D is determined. Here, the pattern density of layout 301D is 38%. In step S473, the difference between the pattern density of layout 301D and the target pattern density is determined. Here, the difference is 22%. In step S475, it is determined whether the difference exceeds a predetermined limit and if so, the method proceeds to step S48, otherwise the method ends.

In step S48, it is determined whether a growing process or a seeding process is adopted to achieve the target pattern density. If the growing process is adopted, the method proceeds to step S49, if the seeding process is adopted, the method returns to step S45. Whether to adopt the growing process or the seeding process can be determined according to a predetermined principle. For example, when the density difference exceeds a preset limit, say, 10%, the seeding process is adopted, otherwise the growing process is adopted.

In step S49, the dummy seeds 371a and 371b are expanded to occupy an adjacent area. The expansion can be executed according to a predetermined principle. Using FIG. 3E as an example, dummy structures 371a' and 371b' of layout 301E are generated by expanding dummy seeds 371a and 371b of layout 301D. By expanding the dummy seeds, the pattern density of layout 301E achieves 60%. Using FIG. 3F as an example, layout 301F comprises active conductive features 311, 313, and 315, and dummy structures 371a' and 371b'.

If the seeding process is adopted in step S48, another suitable dummy template (hereinafter referred to as a second dummy template) is selected from the dummy templates provided in step S42 according to the density difference determined in step S473. Here, the density difference determined in step S473 is 22%, and a dummy template of pattern density 25% is selected from dummy template library 37. The suitable dummy template can also be selected from dummy template libraries 38 or 39. The selected dummy template (pattern density 25%) is integrated into layout 301D. Using FIG. 3G as an example, dummy seeds 372a~372d are added into layout 301D, and part of the dummy seeds are overlapped with the active conductive features 311, 313, and 315 or boundary areas 331, 333, and 335. The dummy seeds overlapped the active conductive features or the boundary areas are deleted. Using FIG. 3G as an example, dummy seed 372a does not overlap any of the active conductive features or the boundary areas, thus, dummy seed 372a is not removed from layout 301G. Steps 45~475 can be repeated until the target pattern density is achieved.

Figure 5:
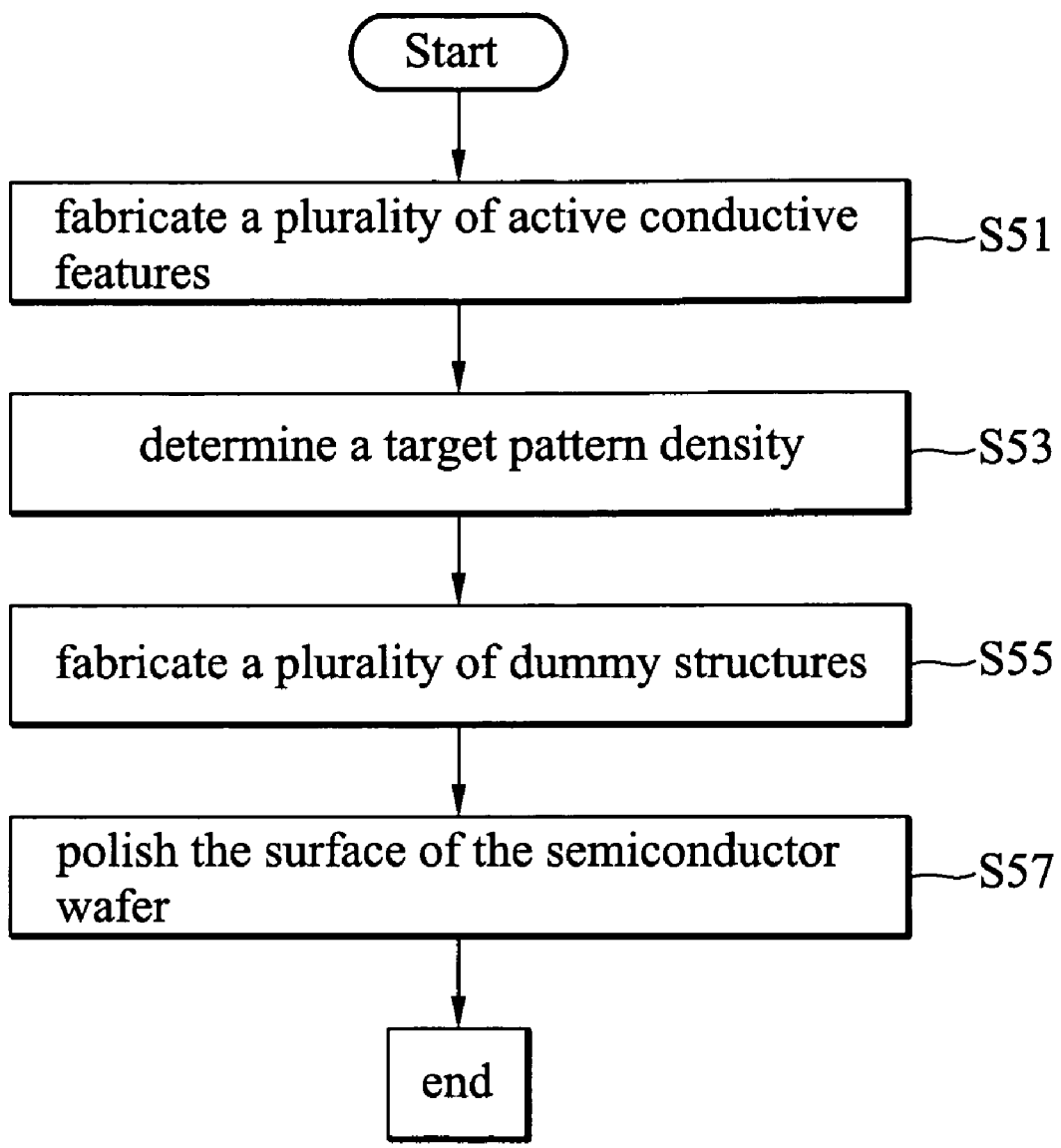
FIG. 5 illustrates a flowchart of an embodiment of a method of fabricating a semiconductor wafer having at least one integrated circuit.

The layout generated by the method of FIG. 4B can be used for fabricating a semiconductor wafer having at least one integrated circuit. FIG. 5 illustrates a flowchart of an embodiment of a method of fabricating a semiconductor wafer having at least one integrated circuit. In step S51, a plurality of active conductive features are fabricated on a surface of a substrate of the semiconductor wafer. Each of the active conductive features being surrounded by a boundary area, wherein adjacent boundary areas are separated by an open area.

In step S53, a target pattern density is determined for the surface of the semiconductor wafer. In step S55, a plurality of dummy structures is fabricated on the surface of the substrate in the open area. The dummy structures and the active conductor traces achieve the target pattern density over the surface of the substrate. In step S57, the surface of the semiconductor wafer is polished to provide a planar surface on the substrate, whereby the dummy structures cooperate with the active conductive features to improve standardized polishing of the wafer.

The method for generating a layout for a semiconductor device array may take the form of program code (i.e. instructions) embodied in a tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

While the invention has been described by way of example and in terms of the preferred embodiments, it is to be understood that the invention is not limited thereto. To the contrary, it is intended to cover various modifications and similar arrangements (as would be apparent to those skilled in the art) Therefore, the scope of the appended claims should be accorded the broadest interpretation so as to encompass all such modifications and similar arrangements.

What is claimed is:

1. A method performed by a machine for generating a layout for a semiconductor device array, comprising:
   providing a first layout comprising a plurality of active conductive features, each one of the plurality of active conductive features being surrounded by a respective boundary area, and an open area consisting of areas of the first layout that not occupied by any one of the plurality of active conductive features and its respective boundary area;
   providing a plurality of dummy templates of different pattern densities, each of which comprises a plurality of dummy seeds;
   generating a second layout by integrating one of the dummy templates into the first layout and deleting any one of the plurality of dummy seeds within the integrated dummy template overlapping any one of the plurality of active conductive features or its respective boundary area, whereby a plurality of dummy seeds remain in the open area of the second layout; and physcially applying the second layout to a semiconductor device array.

2. The method of claim 1, further comprising growing each one of the plurality of remaining dummy seeds by expanding each of the remaining dummy seeds and deleting any portion of each of the expanded dummy seeds that overlaps any one of the plurality of active conductive features or its respective boundary area.

3. The method of claim 2, wherein expanding each of the remaining dummy seeds comprises expanding each one of the remaining dummy seeds to occupy an area adjacent thereto in a predetermined direction.

4. The method of claim 1, further defining a target pattern density of the second layout, determining an original pattern density of the first layout, and selecting a first dummy template from the dummy templates according to a first difference between the target pattern density and the original pattern density.

5. The method of claim 4, wherein the selected first dummy template has a pattern density approximate to the first difference.

6. The method of claim 4, further determining a secondary pattern density of the first layout after adding the dummy seeds according to the first dummy template, and selecting a second dummy template from the dummy templates according to a second difference between the target pattern density and the secondary pattern density.

7. The method of claim 1, further comprising providing a plurality of the dummy templates corresponding to the same pattern density, wherein each of the dummy templates of the same pattern density comprises dummy seeds of different sizes and/or shapes, respectively.

8. The method of claim 1, wherein the dummy seeds of one of the dummy template are of the same dummy shape or various dummy shapes.

9. A system of generating a layout for a semiconductor device array, comprising:
   an interface receiving a first layout comprising a pluarality of active conductive features each one of the plurality of active conductive features being surrounded by a respective boundary area and an open area consisting of areas of the first layout that are not occupied by any one of the plurality of active conductive features and its boundary area;
   a database storing a plurality of dummy templates of different pattern densities, each of which comprises a plurality of dummy seeds; and
   a processor generating a second layout by integrating one of the dummy templates into the first layout and deleting any one of the pluarlaity of dummy seeds in the integrated dummy template that overlaps any one of the plurality of active conductive features or its respective boundary area, whereby a pluarlaity of dummy seeds remain in the open area of the second layout.

10. The system of claim 9, wherein the processor further expands each one of the plurality of remaining dummy seeds and deleting any portion of each of the expanded dummy seeds that overlaps any one of the plurality of active conductive features or its respective boundary area.

11. The system of claim 10, wherein the processor further expands each of the remaining dummy seeds by expanding each one of the remaining dummy seeds to occupy an area adjacent thereto in a predetermined direction.

12. The system of claim 9, wherein the interface further receives a predetermined target pattern density of the second layout, and the processor further determines an original pattern density of the first layout, and selects a first dummy template from the dummy templates according to a first difference between the target pattern density and the original pattern density.

13. The system of claim 12, wherein the selected first dummy template has a pattern density approximate to the first difference.

14. The system of claim 12, wherein the processor further determines a secondary pattern density of the first layout after adding the dummy seeds according to the first dummy template, and selects a second dummy template from the dummy templates according to a second difference between the target density and the secondary pattern density.

15. The system of claim 9, wherein the database further stores a plurality of the dummy templates corresponding to the same pattern density, wherein each of the dummy templates of the same pattern density comprises dummy seeds of different sizes and/or shapes, respectively.

16. The system of claim 9, wherein the database stores the dummy template comprising dummy seeds of the same dummy shape or various dummy shapes.

* * * * *